United States Patent
Fusco et al.

(10) Patent No.: US 11,507,601 B2
(45) Date of Patent: Nov. 22, 2022

(54) MATCHING A FIRST COLLECTION OF STRINGS WITH A SECOND COLLECTION OF STRINGS

(71) Applicant: International Business Machines Corporation, Armonk, NY (US)

(72) Inventors: Francesco Fusco, Rueschlikon (CH); Yves G. Ineichen, Zurich (CH); Michel F. Speiser, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 15/240,169

(22) Filed: Aug. 18, 2016

(65) Prior Publication Data
US 2018/0052904 A1    Feb. 22, 2018

(51) Int. Cl.
*G06F 16/28*    (2019.01)
*G06F 16/22*    (2019.01)
*G06F 16/9535*    (2019.01)
*G06F 16/2457*    (2019.01)

(52) U.S. Cl.
CPC ........ *G06F 16/285* (2019.01); *G06F 16/2255* (2019.01); *G06F 16/24578* (2019.01); *G06F 16/9535* (2019.01)

(58) Field of Classification Search
None
See application file for complete search history.

(56) References Cited

U.S. PATENT DOCUMENTS

| 8,468,160 B2 | 6/2013 | Hassanzadeh et al. |
| 2009/0319515 A1 | 12/2009 | Minton et al. |
| 2014/0164352 A1* | 6/2014 | Denninghoff ...... H03H 9/02622 707/711 |
| 2014/0330845 A1 | 11/2014 | Feldschuh |

OTHER PUBLICATIONS

Bachteler, An Empirical Comparison of Approaches to Approximate String Matching in Private Record Linkage. 2010. pp. 1-6.*
Thoma et al., "Harmonizing and Combining Large Datasets—An Application to Firm-Level Patent and Accounting Data", Working Paper 15851, National Bureau of Economic Research, Cambridge, MA, Mar. 2010, 44 pgs.

(Continued)

*Primary Examiner* — Tuankhanh D Phan
(74) *Attorney, Agent, or Firm* — Scully, Scott, Murphy & Presser, P.C.; Daniel Morris

(57) ABSTRACT

A method for matching first elements with second elements. Each of the first elements and second elements is a character string. The method comprises: calculating a first integer hash value for each of the first elements using a string hash function, wherein the first integer hash value is an output integer calculated from using each of the first elements as an input character string of the function; calculating second integer hash values for each of the second elements using the function; grouping each of the first elements into at least one group of a set of blocking groups using its first integer hash value; grouping each of the second elements into at the least one group of the set of blocking groups using its second integer hash value; and matching first elements with second elements within each group of the set of blocking groups using a string comparison function.

20 Claims, 5 Drawing Sheets

(56) References Cited

OTHER PUBLICATIONS

Kim et al., "HARRA: Fast Iterative Hashed Record Linkage for Large-Scale Data Collections", EDBT 2010, Mar. 22-26, 2010, Lausanne, Switzerland, 12 pgs.

Weichselbraun et al., "Linked Enterprise Data for Fine Grained Named Entity Linking and Web Intelligence", Proceedings of the 4th International Conference on Web Intelligence, Mining and Semantics (WIMS'14), Jun. 2-4, 2014, Thessaloniki, Greece, 11 pgs.

Gu et al., "Record Linkage: Current Practice and Future Directions", CSIRO Mathematical and Information Sciences, Canberra, Australia, CMIS Technical Report No. 03/83, Jun. 2003, 32 pgs.

* cited by examiner

Trigram for "Logitech" 300

| trigram | hash | weight | weighted hash | | |
|---|---|---|---|---|---|
| log | 1 1 0 | 100 | +100 | +100 | -100 |
| ogi | 1 0 0 | 267 | +267 | -267 | -267 |
| git | 0 1 0 | 350 | -350 | +350 | -350 |
| lte | 0 0 1 | ... | ... | | |
| tec | 1 0 0 | | | | |
| ech | 1 1 0 | | | | |

Compute sum by column: +483 +203 -320

Thresholding gives simhash: 1 1 0

Fig. 3

MATCHING A FIRST COLLECTION OF STRINGS WITH A SECOND COLLECTION OF STRINGS

BACKGROUND

The matching of a first group of strings with a second group of strings can be useful for a variety of tasks such as merging database records, deleting duplicate records, for named entity recognition, and for entity resolution. Entity resolution is the task of identifying records across diverse data sources that refer to the same real-world entity. It is an operation that holds particular gravity in both scientific and industrial disciplines, because of its usefulness in aggregating information. Through data integration richer analytic, learning, and data-mining models can be built. The task is challenging because of issues such as: existence of dirty-data, unknown data schemas, and need for user feedback. Many algorithms have been proposed to address this problem, but all existing solutions acknowledge the high computational complexity of the task as the main bottleneck.

SUMMARY

In one aspect the invention relates to a computer implemented method for matching first elements of a first collection of data elements with second elements of a second collection of data elements. The matching of the first elements with the second elements is performed at least partially with a string hash function. A string hash function as used herein encompasses a function which receives a string and returns a hash value in return. The string hash function receives an input character string. The string hash function divides the input character string into n-grams. An n-gram as used herein is a string consisting of n characters. For instance an n-gram with three characters is also referred to as a trigram. The string hash function calculates an n-gram hash value for each of the n-grams. The string hash function calculates an output integer at least partially by aggregating the n-gram hash value for each of the n-grams.

The aggregation of the n-gram hash value can be performed in different ways. For instance the n-gram hash values could simply be added together bit by bit. In other examples the n-gram hash value may be represented as a binary number and then multiplied by a weighting or weight factor. This would result in an integer value for each bit of the n-gram. The integer value for each of the n-grams could then be summed. To return to a binary value the sum of the integer for each bit could be thresholded to result in either a 0 or a 1.

Each of the first elements is a character string. Each of the second elements is a character string. The computer implemented method matches character strings from the first elements with character strings of the second elements.

The method comprises calculating a first integer hash value for each of the first elements using the string hash function. The first integer hash value of each of the first elements is the output integer calculated from using each of the first elements as the input character string of the string hash function. The method further comprises calculating second integer hash values for each of the second elements using the string hash function. The second integer hash value of each of the second elements is the output integer calculated from using each of the second elements as the input character string of the string hash function.

The method further comprises grouping each of the first elements into at least one group of a set of blocking groups using its first integer hash value. The method further comprises grouping each of the second elements into the at least one group of the set of blocking groups using its second integer hash value. The method further comprises calculating matched elements by matching first elements with second elements within each group of the set of blocking groups using a string comparison function.

In other words, the string hash function is used to sort each of the first elements and each of the second elements into at least one group of a set of blocking groups. This sorting or grouping process is equivalent to measuring of how equal or close the string hash functions of the first and second elements. Grouping the first elements and second elements into the different blocking groups is a form of pruning. In fact, instead of comparing each of the first elements against each of the second elements, a single character string of the first elements can be compared to all character strings of the second elements stored in the corresponding group. A computationally efficient comparison function working on string hash values may be used to create a set of candidate pairs associating character strings of the first elements to character strings of the second elements. Once the candidate pairs are generated within each group, a string comparison function could be used to further filter the pairs. Since the number of candidate pairs is significantly smaller than all the character string combinations within two groups, the string comparison function can for example be an effective and a computationally intensive algorithm.

In another aspect, the invention may provide for a computer program product. The computer program product for example may be containing machine-executable instructions and source code for an application or program. The networked computer system may further comprise a processor for executing the machine-executable instructions. Execution of the machine-executable instructions may cause the processor to perform a computer implemented method as is described in the above description of the method of operating a networked computer system or as is described in the claims.

In another aspect, the invention may provide for a computer system as described above or in the claims and comprising a memory containing machine-executable instructions and source code for an application or program. The networked computer system may further comprise a processor for executing the machine-executable instructions. Execution of the machine-executable instructions may cause the processor to perform a method as is described in the above description of the method of operating a computer system or as is described in the claims.

Embodiments of the present invention and/or examples described herein can be freely combined with each other if they are not mutually exclusive.

BRIEF DESCRIPTION OF THE SEVERAL VIEWS OF THE DRAWINGS

In the following embodiments of the invention are explained in greater detail, by way of example only, making reference to the drawings in which:

FIG. 3 illustrates the calculation of a integer hash value from a string;

DETAILED DESCRIPTION

Figure 1:
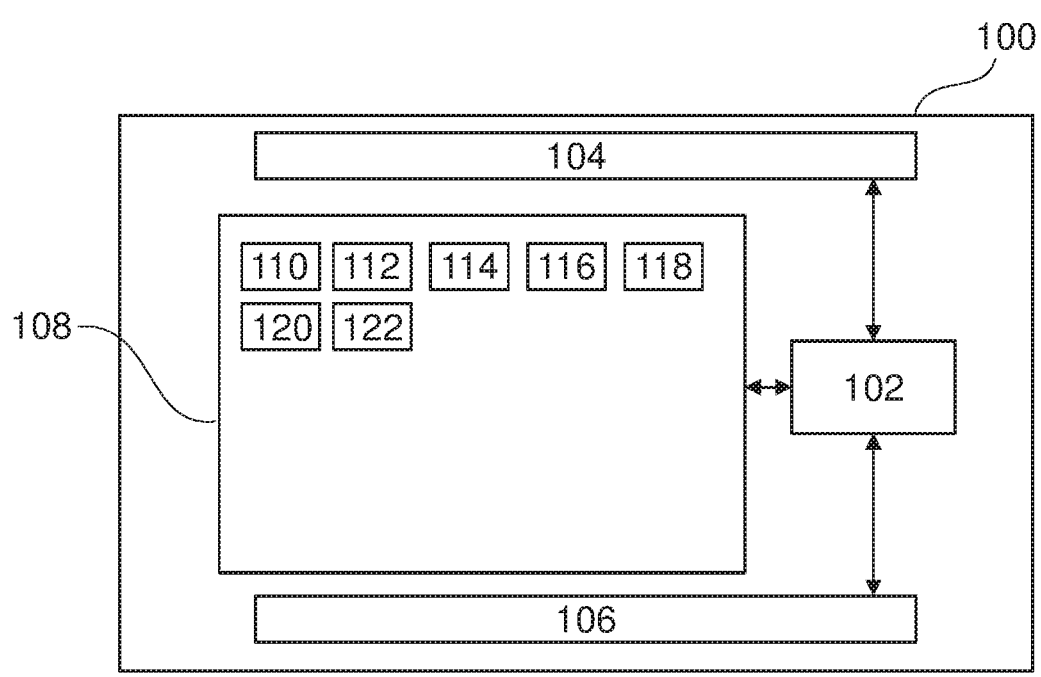
FIG. 1 depicts an implementation of a computer system.

Examples may have the benefit that the amount of computational power needed to match strings of the first elements with strings of the second elements is greatly reduced. The strings of the first elements are all grouped according to an integer hash value as are the strings of the second elements. This may have several computational advantages. Firstly, the computation of the string hash function for each of the first elements and second elements is computationally fast. The grouping of the first elements into the set of blocking groups and the grouping of the second elements into the group of the set of blocking groups is performed using the integer hash values. The grouping is therefore performed using integer operations which is computationally more efficient than using string variables. The first integer hash value and the second integer hash values are used to pre-sort the first elements and the second elements into groups of the set of blocking groups. This reduces the amount of computation necessary because the number of comparisons which need to be made in order to calculate the matched elements may be greatly reduced.

Examples may have the benefit that the use of the first and second integer hash values to sort the first elements and the second elements into the set of blocking groups may enable real time matching of large collections of strings.

In another example, the string hash value multiplies a weighting factor to each n-gram hash value before aggregating the n-gram hash value for each of the n-grams to calculate the output integer. The weighting factor is specific to the n-gram. This example may have the benefit of providing for better grouping of the first elements and second elements into groups of the set of blocking groups. Weighting factors may be used to emphasize less frequently used n-grams and to make n-grams that are frequently used less of a component in the string hash values. For example, if the n-gram is a trigram and the data elements are the name of companies the trigram inc would be very common as many companies are corporations. A weighting factor could be used to minimize the effect of the trigram inc on the first integer hash value or the second integer hash value. Trigrams which are only in a few company names could be given a high weighting such that they have a greater effect on the resulting first integer hash value or second integer hash value.

In another example, the weighting factor represents a relative frequency of occurrence of each n-gram within a named entity domain. The named entity domain may be a collection of named entities to which the data elements belong to or are expected to belong to. The weighting factor may be used to help differentiate the various elements of the named entity domain. This may provide for more efficient grouping of the first elements and second elements into the set of blocking groups.

In another example, the n-gram hash value has a predetermined number of digits. The output integer has a binary representation with a predetermined number of bits. In some cases the n-gram hash value may have the predetermined number of digits in the binary representation. The predetermined number of digits equals the predetermined number of bits. The aggregating of the hash value is performed calculating a separate sum for each digit from each n-gram hash value. The binary representation of the output integer is calculated by applying a threshold to the separate sum of each digit from each n-gram hash value. This may have the advantage that the resulting first integer hash value or second integer hash value is calculated in a computationally efficient means and is also useful for differentiating the first elements and second elements into the various set of blocking groups.

In another example, the grouping of the second integer hash values and the first integer hash values into at least one of a set of blocking groups is performed according to matching a group of adjacent bits in a binary representation of the second integer hash values and the first integer hash values. This example may have the benefit that the grouping of the first elements and the second elements can be performed extremely efficiently.

In another example, the grouping of the second integer hash values and the first integer hash values is performed multiple times using different groups of adjacent bits. This example may be beneficial because if the grouping by adjacent bits is performed multiple times it is more likely that matching first elements and second elements will be placed in at least one common blocking group.

In another example, the matched elements are used to perform a de-duplication of records comprising the first elements and the second elements. In a de-duplication identical records are identified and one of the two records may be deleted. In the case where the records are duplicated but are identified in a slightly different way the example may be beneficial. For example the first element may be an example of one spelling of a company name and the second element may be a second example of the same company but with a spelling change. Matching the elements may allow one of the records to be deleted even though the names are not spelled identically.

In another example, the matched elements are used to merge database records comprising the first elements and the second elements. This may be beneficial when the individual records are identified by a first element and a second element and the spelling or identification of the database records is not identical although they refer to the same named entity.

In another example, the matched elements are used to search a scanned document for named entities. The document contains any one of the following: the first elements, the second elements, and combinations thereof. This may be beneficial when searching complicated documents for named entities when the named entity may take different forms or may contain spelling errors.

In another example, the matched elements are used to link records in a relational database comprising the first elements and the second elements. This may be beneficial when the first elements link one record and the second elements identify a second record and may refer to the same entity or named entity. This example may enable linking of the records even if the identification of the first element and the second element is not identical.

In another example, the matched elements are used to identify search terms during the operation of a search engine. This example may be beneficial because it may enable the identification of the search term even when the search term is not identified exactly on a list. This may enable different forms or spelling of a particular search term to be used.

In another example, the input character string comprises x characters and the string hash function divides the input character string into x-n+1 different n-grams. This example may be beneficial because it then contains the maximum number of n-grams that can be generated from a particular character string.

In another example, the n-gram is a trigram. The use of a trigram may be beneficial because many words which are spelled phonetically can be broken into several different trigrams. The choice of using a trigram may provide for integer hash values which effectively differentiates different words. If 4-grams or 5-grams are used, not as many n-grams per word are produced. The choice of a trigram is often better than using 2-grams because three letter may provide a better "fingerprint" of the word.

In another example, the string hash value is calculated using a function that is equivalent to a locally sensitive hashing function for strings. A locality sensitive hashing function is a function which maps input items which are close to each other according to a specific metric to the same bucket with high probability. Locality sensitive hashing can be applied to the string matching problem by representing a string as a multidimensional feature bit-vector having the same length as the number of distinct characters and j-th bit set to 1 if the character corresponding to the position j appears in the string. For example if a particular character is changed with respect to another string a locality sensitive hashing function could map the two strings to the same bucket. The use of a locality sensitive hashing function may be beneficial because it may enable names or entities which are spelled very similarly to be identified or put into the same groups.

In another example, the string hash function is a SimHash function. The use of a SimHash function may be beneficial because it may be useful for quickly and efficiently generating the first integer hash value and/or the second integer hash value.

In another example, the string comparison function matches the first elements with the second elements in each of the set of blocking groups by comparing the first integer hash value with the second integer hash value. In this example, the integer values themselves are used to look for the matching. This may take different forms. For example, the integer hash values may be displayed in different representations such as binary or in decimal form. The comparison of individual digits in either binary or decimal or other base number systems may be used to evaluate how close a first element matches with a second element.

In another example, the string comparison function is a Jaro-Winkler algorithm. The use of the Jaro-Winkler algorithm is a very effective but computationally expensive means of matching a character string with another group of character strings. The pre-sorting that occurs by grouping each of the first elements into the set of blocking groups and grouping the second elements into the set of blocking groups may greatly reduce the amount of computational time necessary to effectively use the Jaro-Winkler algorithm. The combination of this pre-grouping or filtering with the Jaro-Winkler algorithm may provide for a computationally intensive but highly effective means of matching first elements of a first collection of data elements with second elements of a second collection of data elements.

FIG. 1 shows an example of a computer system 100. The computer system comprises a processor 102 that is connected to a user interface 104, a display 106, and a memory 108. The user interface 104 and the display 106 are optional. The processor 102 is connected to the memory. The memory 108 may be any collection of volatile or non-volatile memory which the processor 102 may access. The memory 108 may also include memory or storage which is located remotely across a network but the processor 102 nevertheless has access to. The memory 108 is shown as having a first collection of data elements 110 and a second collection of data elements 112. Each of the first data elements 110 is a character string. Each of the second elements 112 is also a character string. The memory 108 is further shown as containing machine-executable code 114 which enables the processor 102 to function and perform the method as is illustrated in FIG. 2.

The memory 108 is further shown as containing a first integer hash value 116 that has been calculated for each of the first collection of data elements 110. The computer memory 108 is further shown as containing a second integer hash value 118 that has been calculated for each of the second collection of data elements 112. Execution of the machine-executable code 114 enables the processor 102 to use the first integer hash values 116 and the second integer hash values 118 to assign each of the first collection of data elements 110 and the second collection of data elements 112 respectively to a collection of blocking groups 120. The machine-executable code 114 then further causes the processor 102 to calculate matches 122 between the first collection of data elements and the second collection of data elements within each of the blocking groups 120. The matches 122 are stored within the memory 108.

Figure 2:
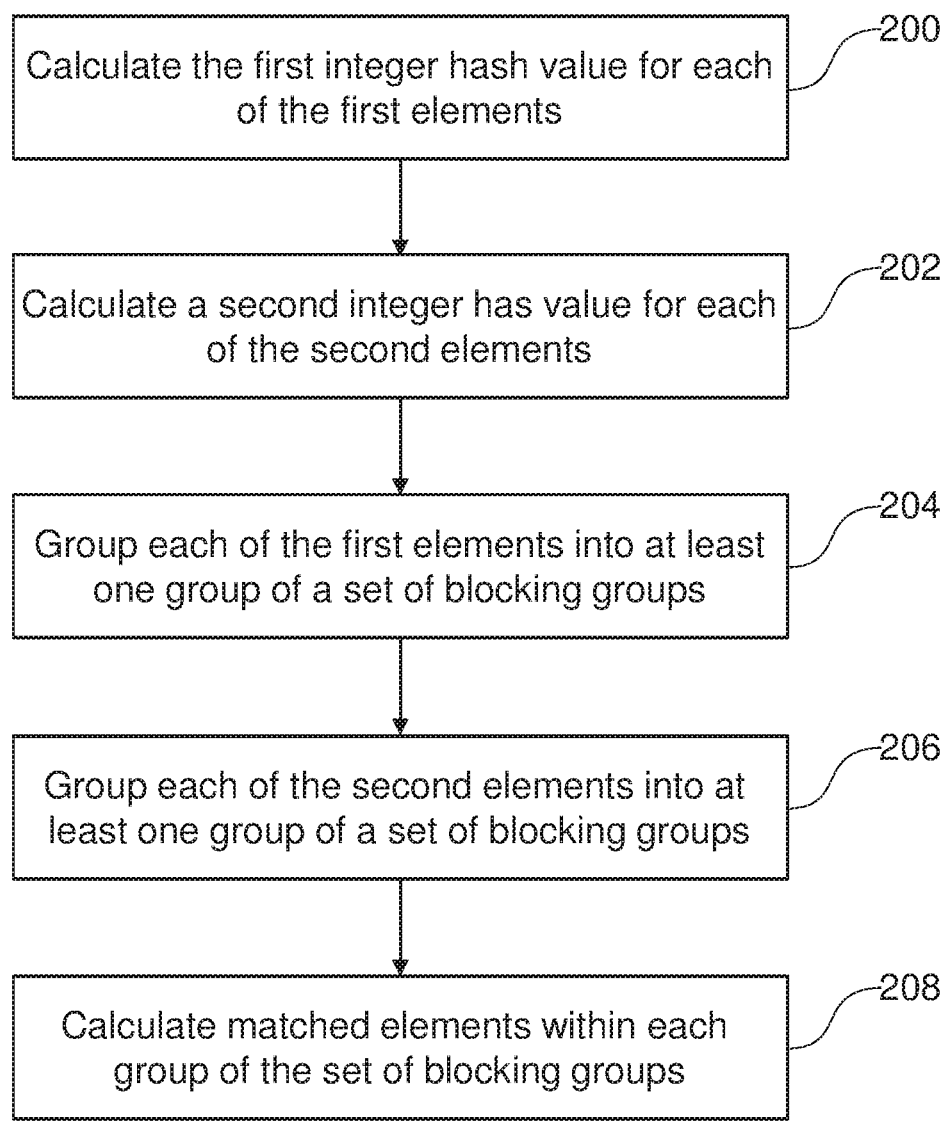
FIG. 2 shows a block diagram which illustrates a method of operating the computer system of FIG. 1.

FIG. 2 shows a flowchart which illustrates an example of a computer implemented method which may be performed by the processor 102 of the computer 100 of FIG. 1. The method starts with step 200 in which a first integer hash value 116 is calculated for each of the first elements of the first collection of data elements 110. The first integer hash value of each of the first elements is the output integer calculated from using each of the first elements as the input character string of a string hash function. The string hash function receives an input character string. The string hash function divides the input character string into n-grams. The string hash function calculates an n-gram hash value for each of the n-grams. The string hash function calculates an output integer at least partially by aggregating the n-gram hash value for each of the n-grams.

Next in step 202 a second integer hash value 118 is calculated for each of the second elements of the second collection of data elements 112. This is done using the string hash function. The string hash function may be implemented in the machine-executable code 114. The second integer hash value of each of the second elements is the output integer calculated from using each of the second elements as the input character string of the string hash function. Next in step 204 each of the first elements 110 is grouped into at least one group of a set of blocking groups 120 using the first integer hash value 116. Next in step 206 each of the second elements 112 is grouped into the at least one group of the set of blocking groups 120 using its second integer hash value 118. Finally, in step 208 matched elements 122 are calculated by matching first elements 110 with second elements 120 within each of the group of the set of blocking groups 120. This is done using a string comparison function.

FIG. 3 illustrates an example of a string hash function. The string hash function takes the string "Logitech" 300 as the input character string. The input character string 300 can be divided into six different trigrams 302. The six different trigrams 302 are listed as a column. A variety of functions may then be used to map each of the trigrams 302 to an integer hash value 304. For example the trigram log is mapped to the hash function 110 in binary form. The trigram ogi is mapped to the hash value 100. The hash value 304 for each trigram 302 is listed adjacent to it. Prior knowledge of how frequently a trigram appears may be used to weight the importance of specific trigrams. For example if the input character strings were all company names the trigram "inc," which is an abbreviation for incorporated, may be quite common. Giving a low weighting to a value such as "inc," which occurs often in company names, may help to differentiate different companies from each other. The column labeled 306 contains a weighting factor. For each trigram there may be a weighting value which is also associated with that trigram. For example the weighting factor could be a measure or distribution which represents how often the particular trigram or n-gram appears within a named entity domain. In column 309 a weighted hash is now calculated. The weighted hash is essentially an aggregation. The hash value 304 is represented in binary form and the weight 306 is represented as an integer. The weighted hash 309 is the weighting value 306 mapped into a collection of integers by the hash function 304.

For example, a value of 1 and a hash causes the entry of a positive value in the column corresponding to that digit and a 0 represents a negative value in a column representing a digit. The trigram log has a hash value of 110. The weighting factor is 100. The resulting weighted hash is a collection of three integers: +100, +100, and −100. This operation is then performed for each of the hash values 304 with the weighting functions 306. The resulting weighted hashes 309 are then summed by column. For each binary digit in the resulting output integer 312 there is now an integer value. A predetermined threshold can be applied to each of the sums for each column to result in either a 0 or a 1. The sum for each digit 310 can then be converted into a digit of the output integer 312.

The process of generating an integer hash value as described above can be repeated for other strings as well and the integer value can be used to assign the strings to different blocking groups. For example if there are two groups of strings: first elements of a first collection of data elements (first group of strings) and second elements of a second collection of data elements (second group of strings). An integer hash value can be calculated for each of the first and second group of strings. The integer value itself can be used to assign the strings to distinct blocking groups. The integer hash values can be expressed in binary form and groups of matching bits can be used to assign strings to particular blocking groups.

For example if there are three strings A, B, and C. String A has an integer hash value of 101101101001. String B has an integer hash value of 101101101001. String C has an integer hash value of 110000101011. The three left most bits can arbitrarily be selected as the sorting criterion. Strings A and B have left most bits that are matching: 101. String C's three left most bits are 110. Strings A and B would be assigned to the same blocking group and string C would be assigned to a different blocking group.

This sorting of strings into blocking groups can be repeated quickly for a large number of strings. Once strings have been sorted into blocking groups strings within the blocking group can be matched using known, but possibly computationally intensive string comparison functions. Sorting the strings into the blocking groups reduces the number of string comparisons which need to be made, which may result in a large computational savings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An application of the above described method may be Entity Resolution (EnR), which is a fundamental operation for information integration and a necessary foundation for supporting higher-level analytics. It refers to the task of identifying same or similar entities within different, potentially unreliable, data sources. EnR is such a rudimentary problem in any data consolidation project, that it has appeared in the literature under a multitude of names: record linkage, entity matching or linking, de-duplication, etc. Entity Resolution may be performed at least partially by matching groups of strings.

The matching of large groups of strings may be useful in providing a "360 degree view" about organizations to the user. These organizations are mostly companies, government agencies and NGOs, but can also be individuals, families, etc. A 360 degree view, may mean that many different aspects about a given entity are accessible in the same place, and used in combination, to provide a holistic description of that entity, and possibly also recommendations on how to engage with that entity. The collective business value of the 360 degree view compounds with the number of aspects added to the profile, because each additional aspect can be combined with all the others, to provide richer functionality and intelligence.

While from a user perspective, this idea of assembling all relevant data about an entity seems very natural, it is very challenging from organizational and technical perspectives, because it involves connecting together very different teams, systems and data sources. The main technical challenge resides in the fact that most of the time, records relating to the same entity do not have a common key across data sources. Therefore, an EnR solution is required to provide these crucial connections. Obviously, the entire value chain of a 360 degree view system depends critically on the quality of the linkage across data sources.

String similarity functions such as the Jaro distance or the Jaro-Winkler may be been to perform record linkage tasks. The similarity of two strings is close to 1.0 if the strings are very similar, and close to 0.0 if they are very dissimilar (e.g. "Martha" and "Marhta" have a similarity of about 0.94, "Martha" and "Margareth" have a similarity of about 0.70, and "Martha" and "Nicole" have a similarity of 0.0). The shortcoming of a record linkage solution based on string similarity functions is the computational complexity. Given two datasets A of cardinality n and B of cardinality m the computational complexity to score all the candidates pairs is $O(n \times m)$.

An approach to reduce the computational complexity consists of using blocking techniques based on domain knowledge. In a nutshell, blocking techniques rely on domain knowledge to split A and B in subsets $\{A1 \cup \ldots \cup AD\}$ and $\{B1 \cup \ldots \cup BD\}$ respectively, such that comparisons have to be performed between subset pairs $\{Ai, Bi\}$ for $i=1 \ldots D$ only. This way the complexity can be reduced from $O(n \times m)$ to $O(z \times k)$ where $z \ll n$ and $k \ll m$.

Unfortunately, this approach rarely yields a sufficient improvement in practice. In the case of company names, limitations are evident when trying to use the company's country as a blocking criterion. Some countries, such as the United States, usually contain a large portion of the records. Therefore, the computational complexity is of the same order when using or not using this blocking criterion. Each record is assigned to zero or more blocks, and within a block, each pair-wise combination of records (one from A and one from B) has to be evaluated with the score function. In some examples the blocking criterion is implemented by assigning an integer hash value to strings representing each record. The strings are then pre-sorted or blocked by using the integer values to assign strings from both group A and group B to a set of blocking groups.

The family of record linkage algorithms (string comparison function or algorithm) based on string distance functions usually have not only a quadratic complexity ($O(n^2)$) in the size of the input set, but furthermore, they require computationally intensive string similarity computations, typically also quadratic (or worse) in the length of the strings, which can be rather expensive. For instance, approximately 100,000 pairs per second can be evaluated on a 2.1 Ghz Intel Xeon E312xx (Sandy Bridge) core. One database contains about 125 million records, and the largest block contains about 20 million records. Thus, on a single core it would require more than 63 years to process that single block.

Some of the above described examples may provide for an effective method for producing blocks (a blocking group belonging to a set of blocking groups) which are much smaller than what can typically be obtained by domain knowledge, but which still contain nearly all of the important record pairs (matched elements). For example, on a single core the task above will take a few minutes instead of decades. This may be achieved by computing a "fingerprint" (integer hash value) for each name (string). In some examples this fingerprint may be an integer value derived from a string hash function. This fingerprint determines which blocks the record belongs to, and hence which other records it will be compared to. The fingerprints may be obtained by building upon a string hashing scheme, for example an algorithm called SimHash.

Some of the above described examples may accelerate the retrieval of matching candidates when linking two datasets X and Y of string records. More in detail, the same matches that a solution based on Jaro-Winkler can be provided, but in a fraction of the time. More specifically, the baseline is a composite scoring function that combines string comparison scores of individual words in the names, by weighting those scores based on some function f of the frequency of occurrence of those words.

---

Algorithm 1 Compute the similarity between two names
using string comparison function s (e.g. Jaro-Winkler)
and frequency function f (e.g. identity)

```
    simScore(name₁,name₂)
1:  for w₁ in words(name₁) do
2:      best[w₁] = argmax_{w₂∈words(name₂)}(s(w₁,w₂))
3:  end for
4:  score = Σᵢ s(wᵢ,best[wᵢ])/f(wᵢ)/Σᵢ 1.0/f(wᵢ)
5:  return score
6:
7:  symmSimScore(name₁,name₂)
8:  score = (simScore(name₁,name₂) + simScore(name₂,name₁))/2
9:  return score
```

---

Compared to a pairwise string-matching approach based on the Algorithm 1, where s is Jaro-Winkler and f is the square root of the word's frequency of occurrence in a large database of company names. Examples may provide for matching that is 3000× faster and yet retrieves 85% of the pairs when compared to Algorithm 1.

Figure 4:
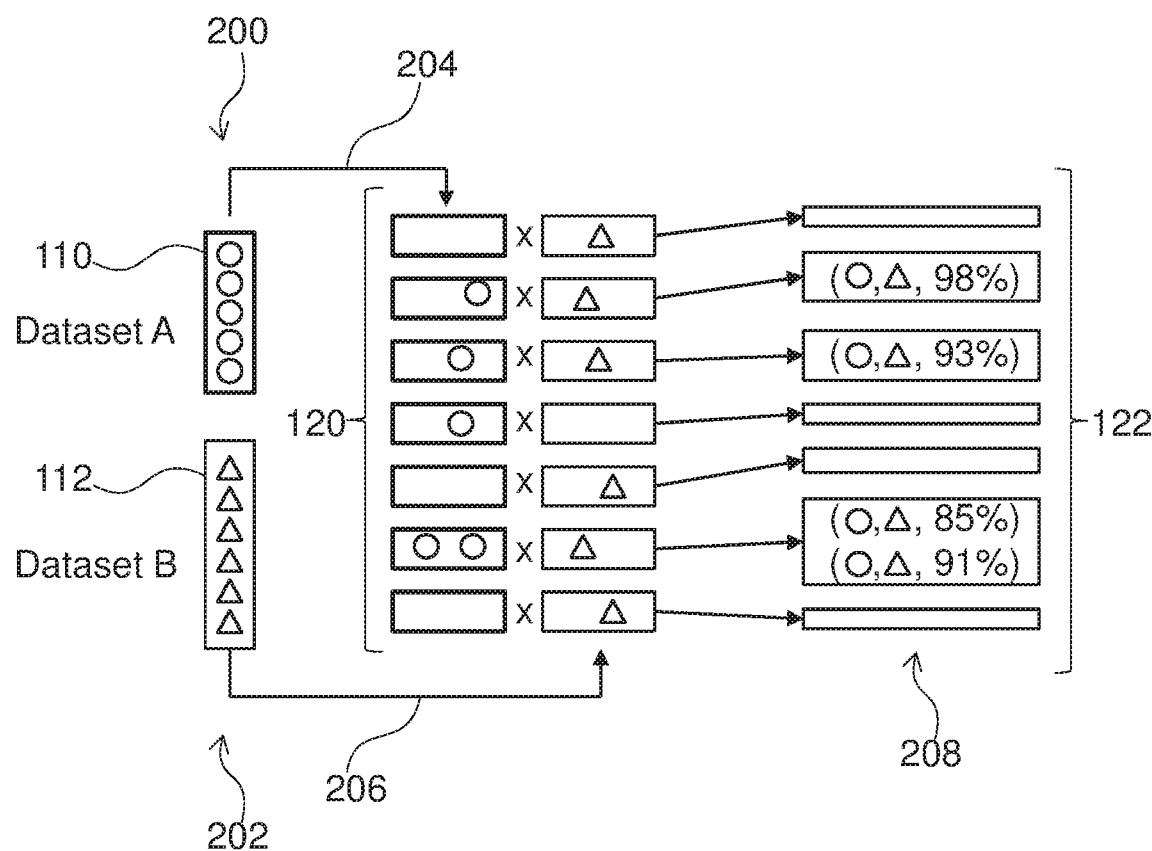
FIG. 4 shows a chart which demonstrates the matching of first elements of a first collection of data elements with second elements of a second collection of data elements.

Examples may therefore be an enabling technology:
it lets us operate on larger datasets that could not be handled by a pair-wise string matching approach.
it frees resources to perform more complex operations, such as using GeoLocalization and more complex heuristics Examples may have one or more of the following features:
1. reduced the time to compare two records by moving the problem from string comparisons to integer comparisons
2. decreased the number of record comparisons to be made by introducing an unsupervised blocking scheme In FIG. 4 a high level description is provided. It relies on particular hash function that provide the following property. If two strings are similar, then the corresponding hash values have a small hamming distance. The leftmost k bits of a those hash values are used as a blocking criterion (assignment to particular blocking group). Those bits are computed from the input data, and the assumption is that similar strings have high probability of sharing the same bits. By using this content based blocking criterion, one can partition both the dataset A and B into multiple blocks A1, . . . , An and B1, . . . , Bn. To retrieve the matches one need only compute the hamming distance between all the block pairs (Ai, Bi) for i=1 to n. Comparing each block pair is an operation with quadratic complexity. This content based blocking scheme can reduce the complexity from $O(|A|*|B|)$ to $O(max_j(|A_j|)*max_j(|B_j|))$. This way the complexity of record linkage (calculating matched elements) is drastically reduced.

FIG. 4 is analogous to FIGS. 1 and 2 and illustrates how a string hash function such as the SimHash function can be used to act as a blocking function for matching the first elements of the first collection of data elements with second elements of a second collection of data elements. FIG. 4 shows the first collection of data elements 110 and the second collection of data elements 112. First the first integer hash value 200 is calculated for each of the first collection of data elements 110. A second integer hash value 202 is calculated for each of the second collection of data elements 112. Next at 204 the first elements 110 are each assigned to blocking groups 120 using the first integer hash value. Next in 206 the second collection of data elements 112 are each assigned to one of the blocking groups 120 using the second integer hash value 118. Once the first elements and the second elements have been assigned to the blocking groups 120 they are then matched within each of the blocking groups 120 at 208. This results in a set of calculated matches 122.

Optimizing the per match cost. A record linkage solution is using Jaro-Winkler algorithm to find the set of candidate pairs. By specifying the similarity threshold, one can influence the amount of matching pairs detected by the record linkage solution.

Examples may improve the performance of the candidate generation code, while preserving the functionality of being able to tweak the cardinality of the result set.

In particular, examples may provide for a means to quickly and cheaply filter out the candidate pairs that would not pass the Jaro-Winkler filter. Examples may use a hash-based scheme to quickly compare hash values of records instead of string themselves. Having a hash function which captures the similarity between strings, that is which yields very similar hash values for very similar strings, would have high potential to achieve the goal of efficient filtering. First, the amount of data to be compared would be substantially reduced. Second, operating on hash values (i.e. integers) instead of string opens many optimization opportunities:
1. low-level software optimizations using Single Instructions Multiple Data (SIMD)
2. GPU-based accelerators
3. custom hardware implementations using FPGA and ASICS Reducing the number of pair comparisons. Examples may provide not just for optimizing the per pair cost, but also in reducing the number of comparisons required when matching two datasets. In a nutshell, examples may provide for an adaptive blocking scheme that would act as a blocking criterion. Again, having a hash function which captures the similarity between strings could be of use to restrict the comparisons to those pairs for which the hash values are similar.

To achieve both goals, hashing techniques based on SimHash fingerprints may be used and then adapted to the record linkage problem at hand (i.e. linking company names):

Algorithm 2 below outlines the retrieval of pairs using a string hash function that generates integer hash values that are used for sorting strings into blocking groups.

Algorithm 2 Compute the set of matches between two datasets X and Y

```
       ComputeMatches ( hammingDistance )
 1:    numBits = 8
 2:    numRotations = 3
 3:    for R_x in Records_X do
 4:        Hashes_x.append(computeSimHash32(R_x))
 5:    end for
 6:    { Compute the hashes for set X }
 7:
 8:    for R_y in Records_Y do
 9:        Hashes_y.append(computeSimHash32(R_y))
10:    end for
11:    { Compute the hashes for set Y }
12:
13:    matchSet = ∅
14:    numBlocks = 2^numBits − 1
15:
16:    for i = 0 to numRotations do
17:        shiftHashes(Hashes_y, numBits)
18:        sort(Hashes_y)
19:
20:        shiftHashes(Hashes_x, numBits)
21:        sort(Hashes_x)
22:
23:        { Now we can compute the blocks using numBits as
           block id}
24:        (blocks_x, blocks_y) = createBlocks(Hashes_x, Hashes_y,
           numBits)
25:        for (i = 0 ; i < numBits; i++) do
26:            matchSet.add(ComputeMatches(blocks_x[i],
               blocks_y[i], hammingDistance))
27:        end for
28:    end for
29:    return matchSet
```

Algorithm 3 illustrates the calculation of a SimHash integer hash value from an input character string.

Algorithm 3 Compute the simhash value of a given record

```
       computeSimHash32( stringRecord )
 1:    int[32] histogram
 2:    weight = 1
 3:    for trigram in StringRecord do
 4:        trigramHash = MurmurHash(trigram)
 5:        for (i = 0 ; i ≤ 32; i++) do
 6:            if (trigramHash[i] == 0) then
 7:                histogram[i] += +1 * weight
 8:            else
 9:                histogram[i] += −1 * weigth
10:            end if
11:        end for
12:    end for
13:
14:    simhash = 0
15:
16:    for i= 0 ; i < 32; i++ do
17:        sign = histogram[i]
18:        setBit(simhash, i, sign)
19:    end for
20:
21:    return simhash
```

After a pair of blocks extracted by using the first k bit of each SimHash as a pivot, one can compute the matches using ComputeMatches operates as described in algorithm 4. An advanced implementation that relies on instructions provided by modern processors may be constructed. One may exploit them to accelerate the hamming distance computation. To compute the hamming distance between two integers one can XOR them, and then use the POPCNT instruction, which is present in the vast majority of the modern architectures including X86_64, SparcV9, PowerPC, ARMv8, to efficiently count the number of bits set in the result. Additionally, one may also use the SIMD instructions to XOR 4 numbers in parallel with a single instruction.

Algorithm 4 Compute the set of matches between two blocks

```
       ComputeMatches (Hashes_X, Hashes_Y, hammingThreshold)
 1:    matches = ∅
 2:
 3:    i = 0
 4:    for h_x in Hashes_X do
 5:        j = 0
 6:        for h_y in Hashes_Y do
 7:            if (hammingDistance(h_x, h_y) ≤
               hammingThreshold) then
 8:                addMatch(i, j, dist)
 9:            end if
10:            j + +
11:        end for
12:
13:        i + +
14:    end for
15:
16:    return matches
```

Instead of using plain hashing, one can use weights to alter the fingerprints. More frequent n-grams have to have higher impact on the overall layout of the fingerprints. n-grams that are very frequent (e.g. Ltd. found in many company names) should account for less.

One solution is based on the n-gram frequencies extracted from a sample of records belonging the same block. In particular, linking records from set X and Y belonging to the domain specified block B may involve one or more of the following three steps:

1. retrieve a set of sample records belonging to the block B and extract n-gram frequencies from it. This record set can be obtained by manually annotating data, or acquired on the market. For example, if the goal is to match companies within the US, one can first get a sample of company names that are known to operate in the United States. Trigrams are effective in practical implementations. Using trigrams instead of 4-grams did not provide significant benefits while requiring larger lookup tables.

2. compute the SimHash values $H_x$ (first integer hash value) for set X and the hash values $H_y$ for set Y (second integer hash value) using the same n-gram frequencies computed from the set B. In practice, the algorithm 3 can be used, with the only difference in line 7 and 8. In this case, the weight corresponds to the frequency of the current trigram $$\text{weight} = 1000 \max(e^{-0.4 t_i}, 0.2)/(1+n_i)/\sqrt{f(n_i)},$$

where $f(n_i)$ is the frequency of the current n-gram $n_i$, and $t_i$ is the current token index.

3. generate the candidate pairs using algorithm 2.

Examples may be used to efficiently retrieve 90% of the matching pairs. Post-Filters can be chained to filter out pairs that are not desired. The simplest way to increase the precision when comparing to a Jaro-Winkler approach is to compute that scoring function on the candidate pairs, and then use a threshold. Applying those filter would not penalize the performance significantly, as the filter is only applied to a small subset of the pairs.

In order to quantify the benefits of the presented approach the following setup was used:

1. The benchmark dataset consists of O(40k) Swiss company names.
2. The reference matches and scores are computed using an $N^2$ approach using algorithm 2 as pair scoring function.
3. The SimHash matches and scores are computed with and without post-filter.

To evaluate the performance of those approaches they were implemented in C++. The implementation is single-threaded. Experiments were then run on a KVM-based virtual machine hosted by 2.1 Ghz Intel Xeon E312xx (Sandy Bridge) core.

TABLE 1

Timings of used approaches.

| Approach | Time [seconds] |
|---|---|
| $N^2$ approach with algorithm 2 | 4387 |
| SimHash (no filter) of algorithm 2 | 0.2 |
| SimHash (TF-IDF filter) | 1.5 |

Figure 6:
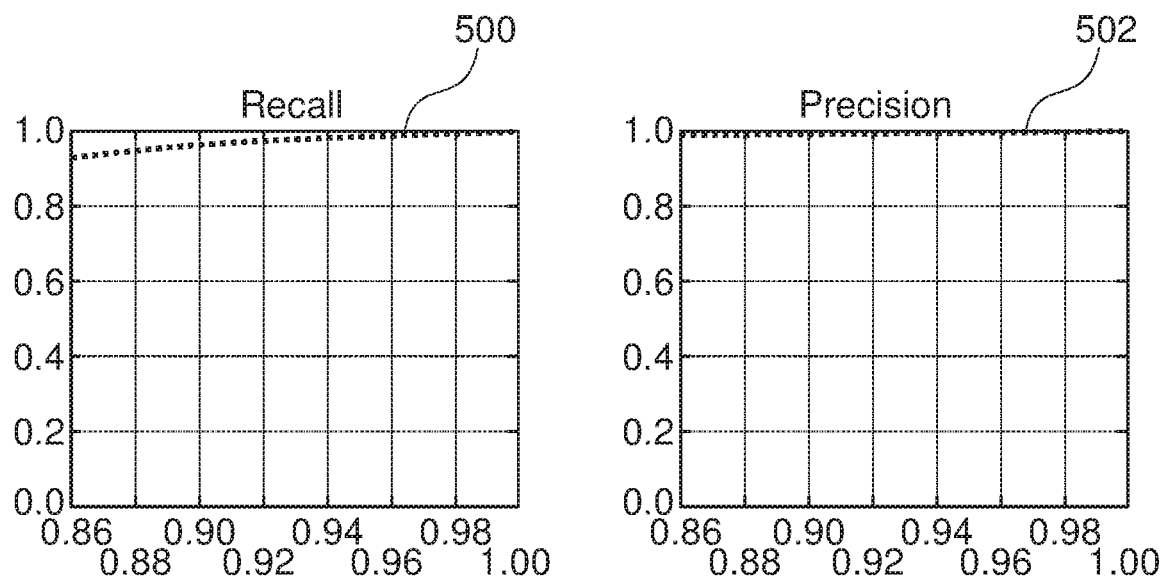
FIG. 6 shows test results for the matching of company names using a Modified TF-IDF post-filter.

The timings are reported in Table 1 show that the SimHash-based approach is 3 orders of magnitude faster. Regardless of what weighting scheme were applied, when constructing the fingerprints, all matches were computed in less than 2 seconds. Indeed, it acts as a good "pre"-filter producing an acceptable recall. In order to recover precision a cheap post-filter step (see above) on the SimHash pre-filtered results suffices. FIG. 6 visualizes the effect of the post-filter on precision.

Figure 5:
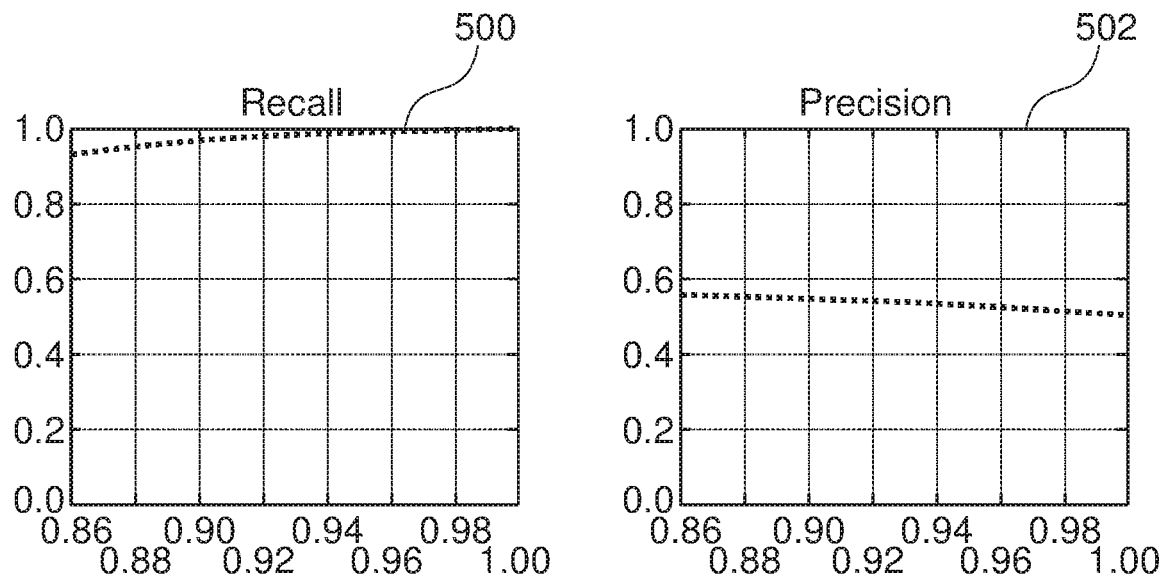
FIG. 5 shows test results for the matching of company names using a SimHash function without a filter.

FIGS. 5 and 6 are used to compare a modified TF-IDF algorithm (term frequency and inverse document frequency algorithm) which is used as a weighting factor with the SimHash-based blocking that uses no filter (does not use a weighting factor). FIG. 5 shows the use of the SimHash function without a filter. The recall 500 and the precision 502 is shown. The recall is a measure of how many relevant items are selected. The precision is a measure of how many selected items are relevant. The recall in FIG. 5 is near one, so almost all strings that were selected were relevant, however the recall indicates that between 50 and 60% of the relevant strings were selected.

In FIG. 6 the SimHash combined with the TF-IDF filter is used. Again the recall 500 and the precision 502 is shown. The precision 502 in FIG. 6 is higher. In FIG. 6 the precision and the recall are both close to 1. The combined SimHash and TF-IDF filter provides better results.

What is claimed is:

1. A computer implemented method for matching first elements of a first collection of data elements with second elements of a second collection of data elements, wherein each of the first elements is a character string, wherein each of the second elements is a character string, wherein the method comprises:
   receiving, at a string hash function, an input character string;
   dividing, using the string hash function, the input character string into n-grams;
   calculating, using the string hash function, a n-gram hash value for each of the n-grams;
   calculating, using the string hash function, an output integer at least partially by aggregating the n-gram hash value for each of the n-grams, said calculating an output integer comprising multiplying a weighting factor to each n-gram hash value before said aggregating the n-gram hash value for each of the n-grams, said weighting factor being specific to the n-gram;
   calculating a first integer hash value for each of the first elements using the string hash function, wherein the first integer hash value of each of the first elements is the output integer calculated from using each of the first elements as the input character string of the string hash function;
   calculating second integer hash values for each of the second elements using the string hash function, wherein the second integer hash value of each of the second elements is the output integer calculated from using each of the second elements as the input character string of the string hash function;
   grouping each of the first elements into at least one group of a set of blocking groups using its first integer hash value;
   grouping each of the second elements into at the least one group of the set of blocking groups using its second integer hash value; and
   calculating matched elements by matching first elements with second elements within each group of the set of blocking groups using a string comparison function.

2. The computer implemented method of claim 1, wherein the weighting factor represents a relative frequency of occurrence of each n-gram within a named entity domain.

3. The computer implemented method of claim 1, wherein the n-gram hash value has a predetermined number of digits, wherein the output integer has a binary representation with a predetermined number of bits, wherein the predetermined number of digits equals the predetermined number of bits, wherein the aggregating of the hash value is performed calculating a separate sum for each digit from each n-gram hash value, and wherein the binary representation of the output integer is calculated by applying a threshold to the separate sum of each digit from each n-gram hash value.

4. The computer implemented method of claim 1, wherein the grouping of the second integer hash values and the first integer hash values into at least one of the set of blocking groups is performed according to a matching group of adjacent bits in a binary representation of the second integer hash values and the first integer hash values.

5. The computer implemented method of claim 4, wherein the grouping of the second integer hash values and the first integer hash values is performed multiple times using different groups of adjacent bits.

6. The computer implemented method of claim 1, wherein the matched elements are used to perform a de duplication of records comprising the first elements and the second elements.

7. The computer implemented method of claim 1, wherein the matched elements are used to merge database records comprising the first elements and the second elements.

8. The computer implemented method of claim 1, wherein the matched elements are used to search a scanned document for named entities, wherein the document contains any one of the following: the first elements, the second elements, and combinations thereof.

9. The computer implemented method of claim 1, wherein the matched elements are used to link records in a relational database comprising the first elements and the second elements.

10. The computer implemented method of claim 1, wherein the matched elements are used to identify search terms during the operation of a search engine.

11. The computer implemented method of claim 1, wherein if the input character string comprises x characters then the string hash function divides the input character string into x−n+1 different n-grams.

12. The computer implemented method of claim 1, wherein the string hash function is a SimHash function.

13. The computer implemented method of claim 1, wherein the string comparison function matches the first elements with the second elements in each of the set of blocking groups by comparing the first integer hash value with the second integer hash value.

14. The computer implemented method of claim 1, wherein the string comparison function is a Jaro-Winkler algorithm.

15. The computer implemented method of claim 1, grouping each of the first elements into at least one group of a set of blocking groups using its first integer hash value and the grouping each of the second elements into at the least one group of the set of blocking groups using its second integer hash value are both done in a two-step process;
wherein the first step of the two step process comprises grouping each of the first elements and each of the second elements such that they exactly coincide in a given subset of bit positions; and
wherein the second step of the two step process comprises generating candidate pairs from the groups constructed in the first step, by selecting the pairs where the bitwise distance between the hash value of the first element of the pair and the hash value of the second element of the pair is below a given distance threshold.

16. The computer implemented method of claim 15, wherein the bitwise distance is the Hamming distance.

17. The computer implemented method of claim 15, wherein the two-step process is repeated multiple times using different given subsets of bit positions, wherein the results obtained for each of the different given subsets are aggregated.

18. A computer program product for matching first elements of a first collection of data elements with second elements of a second collection of data elements, the computer program product comprising a computer readable storage medium having program instructions embodied therewith, wherein the computer readable storage medium is not a transitory signal per se, the program instructions executable by a computer to cause the computer to perform a method comprising:
calculating a first integer hash value for each of the first elements using a string hash function, wherein the string hash function receives an input character string, wherein the string hash function divides the input character string into n-grams, wherein the string hash function calculates a n-gram hash value for each of the n-grams, wherein the string hash function calculates an output integer at least partially by aggregating the n-gram hash value for each of the n-grams, wherein to calculate said output integer, said program instructions further cause the computer to multiply a weighting factor to each n-gram hash value before said aggregating the n-gram hash value for each of the n-grams, said weighting factor being specific to the n-gram, wherein each of the first elements is a character string, wherein each of the second elements is a character string wherein the first integer hash value of each of the first elements is the output integer calculated from using each of the first elements as the input character string of the string hash function;
calculating second integer hash values for each of the second elements using the string hash function, wherein the second integer hash value of each of the second elements is the output integer calculated from using each of the second elements as the input character string of the string hash function;
grouping each of the first elements into at least one group of a set of blocking groups using its first integer hash value;
grouping each of the second elements into at the least one group of the set of blocking groups using its second integer hash value; and
calculating matched elements by matching first elements with second elements within each group of the set of blocking groups using a string comparison function.

19. A computer system for matching first elements of a first collection of data elements with second elements of a second collection of data elements, wherein each of the first elements is a character string, wherein each of the second elements is a character string, wherein the computer system comprises a memory storing machine executable instructions at at least one processor, wherein the machine executable instructions cause the at least one processor to:
receive, at a string hash function, an input character string;
divide, using the string hash function, the input character string into n-grams;
calculate, using the string hash function, a n-gram hash value for each of the n-grams;
calculate, using the string hash function, an output integer at least partially by aggregating the n-gram hash value for each of the n-grams, wherein to calculate said output integer, said string hash function configured to multiply a weighting factor to each n-gram hash value before said aggregating the n-gram hash value for each of the n-grams, said weighting factor being specific to the n-gram;
calculate a first integer hash value for each of the first elements using the string hash function, wherein the first integer hash value of each of the first elements is the output integer calculated from using each of the first elements as the input character string of the string hash function;
calculate second integer hash values for each of the second elements using the string hash function, wherein the second integer hash value of each of the second elements is the output integer calculated from using each of the second elements as the input character string of the string hash function;
group each of the first elements into at least one group of a set of blocking groups using its first integer hash value;
group each of the second elements into at the least one group of the set of blocking groups using its second integer hash value; and
calculate matched elements by matching first elements with second elements within each group of the set of blocking groups using a string comparison function.

20. The computer implemented method of claim 1, wherein the weighting factor represents a position of the n-gram within a named entity domain.

* * * * *